United States Patent

Desens et al.

[11] Patent Number: 6,097,314
[45] Date of Patent: Aug. 1, 2000

[54] PROCESS AND APPARATUS FOR ASSISTING IN THE PARKING OF A MOTOR VEHICLE

[75] Inventors: Jens Desens, Rottenburg; Siegfried Rump, Weinstadt, both of Germany

[73] Assignee: DaimlerChrysler AG, Stuttgart, Germany

[21] Appl. No.: 09/017,312

[22] Filed: Feb. 2, 1998

[30] Foreign Application Priority Data

Jan. 31, 1997 [DE] Germany .......................... 197 03 517

[51] Int. Cl.$^7$ .................................................. B60Q 1/48
[52] U.S. Cl. ................. 340/932.2; 340/438; 340/425.5; 180/204; 180/167
[58] Field of Search .............................. 340/932.2, 903, 340/933, 435, 438, 436, 437, 425.5; 180/169, 167, 204, 271

[56] References Cited

U.S. PATENT DOCUMENTS

| | | | |
|---|---|---|---|
| 2,736,015 | 2/1956 | Gilvarry et al. | 180/204 |
| 3,117,642 | 1/1964 | Larinoff | 180/204 |
| 4,735,274 | 4/1988 | Good et al. | 180/204 |
| 4,931,930 | 6/1990 | Shyu et al. | 701/36 |
| 5,234,071 | 8/1993 | Kajiwara | 180/169 |
| 5,297,650 | 3/1994 | Gandiglio et al. | 180/204 |
| 5,572,484 | 11/1996 | Gaus et al. | 367/99 |
| 5,742,141 | 4/1998 | Czekaj | 318/587 |

FOREIGN PATENT DOCUMENTS

| | | |
|---|---|---|
| 0 305 907 A1 | of 1989 | European Pat. Off. |
| 29 01 504 B1 | of 1980 | Germany . |
| 37 28 948 A1 | of 1989 | Germany . |
| 42 01 806 A1 | of 1992 | Germany . |
| 44 25 419 C1 | of 1995 | Germany . |
| 38 13 083 C3 | of 1996 | Germany . |
| 63-122155 | 8/1988 | Japan . |
| 2-9997 | 1/1990 | Japan . |
| 4-30300 | of 1992 | Japan . |

*Primary Examiner*—Daniel J. Wu
*Assistant Examiner*—Sihong Huang
*Attorney, Agent, or Firm*—Evenson, McKeown, Edwards & Lenahan, P.L.L.C.

[57] ABSTRACT

In a process and apparatus for indicating and implementing control interventions for parking a motor vehicle, a prospective parking space is measured, and the indicating and the implementation of the control interventions does not take place before a confirmation signal for the start of the parking operation is entered by a vehicle operator. The system for carrying out the process has control devices for displaying and implementing the control interventions for parking a motor vehicle as a function of the confirmation signal.

14 Claims, 2 Drawing Sheets

PROCESS AND APPARATUS FOR ASSISTING IN THE PARKING OF A MOTOR VEHICLE

BACKGROUND AND SUMMARY OF THE INVENTION

This application claims the priority of German patent document 197 03 517.5, the disclosure of which is expressly incorporated by reference herein.

The present invention relates to a process and apparatus for indicating and implementing control interventions for parking a motor vehicle in which a parking gap is measured before the display or implementation of the control interventions.

In known processes of this type, such as disclosed, for example, in German patent document DE 38 13 083 C2, European patent document 0 305 907 A1 and German patent document DE-29 01 504 B1, a desired curve along which the vehicle is to be parked is determined from the vehicle geometry. Deviations from the desired curve, determined by measuring the relevant parameters (such as the vehicle speed, and the steering angle), can be indicated to the vehicle operator by which control interventions he can correct the deviation from the desired curve. Control interventions for parking operation can also be implemented automatically. In an optimal case, the vehicle therefore drives along the desired curve into the parking space.

In such systems, it is also known to measure the size of the parking space before the parking operation, in order to decide whether the vehicle can fit into the space. If the space is large enough, the parking operation can commence immediately following the measurement of the parking space. Likewise, the parking operation can start if it is concluded on the basis of the driving conditions of the vehicle that the vehicle driver wants to drive into a parking space, which can be deduced, for example, if after driving past it, the vehicle stops at the parking space.

In such systems, however, situations may occur which may cause an accident because the vehicle starts to move into a parking space when such movement is not intended by the driver.

For example, when backing into a parking space, when there is a steering angle the front end of the vehicle carries out a swinging motion. Therefore, when a parking operation is started automatically, critical situations may occur because the vehicle may collide with obstacles. Such obstacles may be immobile, or may involve other traffic participants, such as oncoming traffic.

It may also happen that a search for a parking space takes place on a street on which a line of vehicles is parked, for example, on the right side of the roadway. In this case, in the area of a traffic-light-controlled intersection the parking lane may change into a right turn lane. If the traffic light is red and a vehicle is stopped in the right lane in front of the traffic light, there will always be a gap between this vehicle waiting at the traffic light and the vehicle which is first in the line of parked vehicles. This gap will always be large enough to be considered a "parking space". If a vehicle searching for a parking space drives up to the traffic light and stops side-by-side with the vehicle which is waiting in the right-hand lane, according to the known state of the art, a parking operation will be initiated automatically because the vehicle searching for a parking space drove past a gap which is sufficiently large to be a parking space (the gap between the first vehicle in the line of parked vehicles and the vehicle waiting in the right line at the traffic light). The vehicle which is searching for a parking space also stops (because of the red traffic light), which according to the state of the art will initiate an automatic parking operation. It is obvious, however, that the vehicle driver does not intend to start an automatic is parking operation in this case. As a result, critical situations may occur because the vehicle starts to move when the driver does not expect it. Thus, a possible intervention to stop the parking operation may start only after it is too late; that is, when a collision has taken place.

If the parking operation is not initiated automatically, and rather only an indication of the control interventions is provided, no immediate collisions will occur. However, such systems will no longer be accepted if, during the operation of searching for a parking space, control interventions are repeatedly indicated which the vehicle driver may consider nonsensical.

These disadvantages are advantageously avoided by the parking process and apparatus according to the invention, in which the start of a parking operation becomes the responsibility of the vehicle driver. That is, according to the present invention, a parking control intervention will not be displayed or implemented before a confirmation signal has been entered by the driver.

In one embodiment of the invention, measurement of possible parking spaces takes place if another confirmation signal was fed by the driver which differs from the first confirmation signal. This advantageously results in an operation in which the vehicle driver can easily distinguish between a situation in which the search for a parking gap takes place and a situation in which a parking operation is initiated.

In another embodiment of the invention, data concerning a measured parking space are deleted if a confirmation signal for the start of the parking operation is not fed within a defined time period after termination of the measuring of the parking space. Thus, an excessive amount of information is not indicated to the vehicle driver, and reduces the amount of storage capacity necessary for storage of the data.

According to another feature of the invention, the data concerning the measured parking space are deleted if the vehicle has driven a certain distance past the measured parking space, which also limits the required storage capacity site for storing the data and prevents the presentation of excessive information to the vehicle driver. If the vehicle has driven a certain distance (which may be on the order of several vehicle lengths) past the parking space, it may be concluded that the vehicle driver did not want to park there.

According to still another feature of the invention, the data concerning a measured parking space are deleted if the vehicle starts again without parking in the space after it had previously stopped. In the case of this driving action of the vehicle, it may be concluded that the driver does not want to drive into this parking space.

According to yet another feature of the invention, the confirmation signal for the start of a parking operation can be given only when the vehicle is stopped. Particularly important in the case of automatic implementation of the parking operation, this arrangement prevents a gear change (in the sense of a direction change) in the transmission when the vehicle is still moving. Furthermore, this measure provides a certain redundancy with respect to the possible erroneous input of a confirmation signal.

According to another feature of the invention, when the vehicle driver operates the brake of the vehicle during a parking operation, the parking operation is terminated and the data concerning the measured parking space are deleted if the brake has been operated longer than a defined time period.

It was found to be advantageous not to terminate the parking operation immediately after an operation of the brake. Such operation of the brake, which may lead to a stoppage of the vehicle, can take place, for example, if, during the parking operation, traffic flows past the parking vehicle and the vehicle must stop, for example, because the swinging-out front end of the vehicle enters another driving lane. In this case, the parking operation can be continued when the road is free; that is, when there is another break in the traffic.

The invention also provides a system for implementing a parking intervention process, which has control devices for indicating and carrying out the control intentions for parking a motor vehicle as a function of a confirmation signal to be entered by the user. The control devices may consist, for example, of a microprocessor whose outputs are connected with corresponding control elements for intervention in operation of the engine, as well as that of the brake and the steering systems. The inputs of this microprocessor may be connected, for example, to sensors for detecting the vehicle's steering angle and speed, as well as with a device by which a confirmation signal can be fed to the microprocessor by the user.

Other objects, advantages and novel features of the present invention will become apparent from the following detailed description of the invention when considered in conjunction with the accompanying drawings.

DETAILED DESCRIPTION OF THE DRAWINGS

Figure 1:
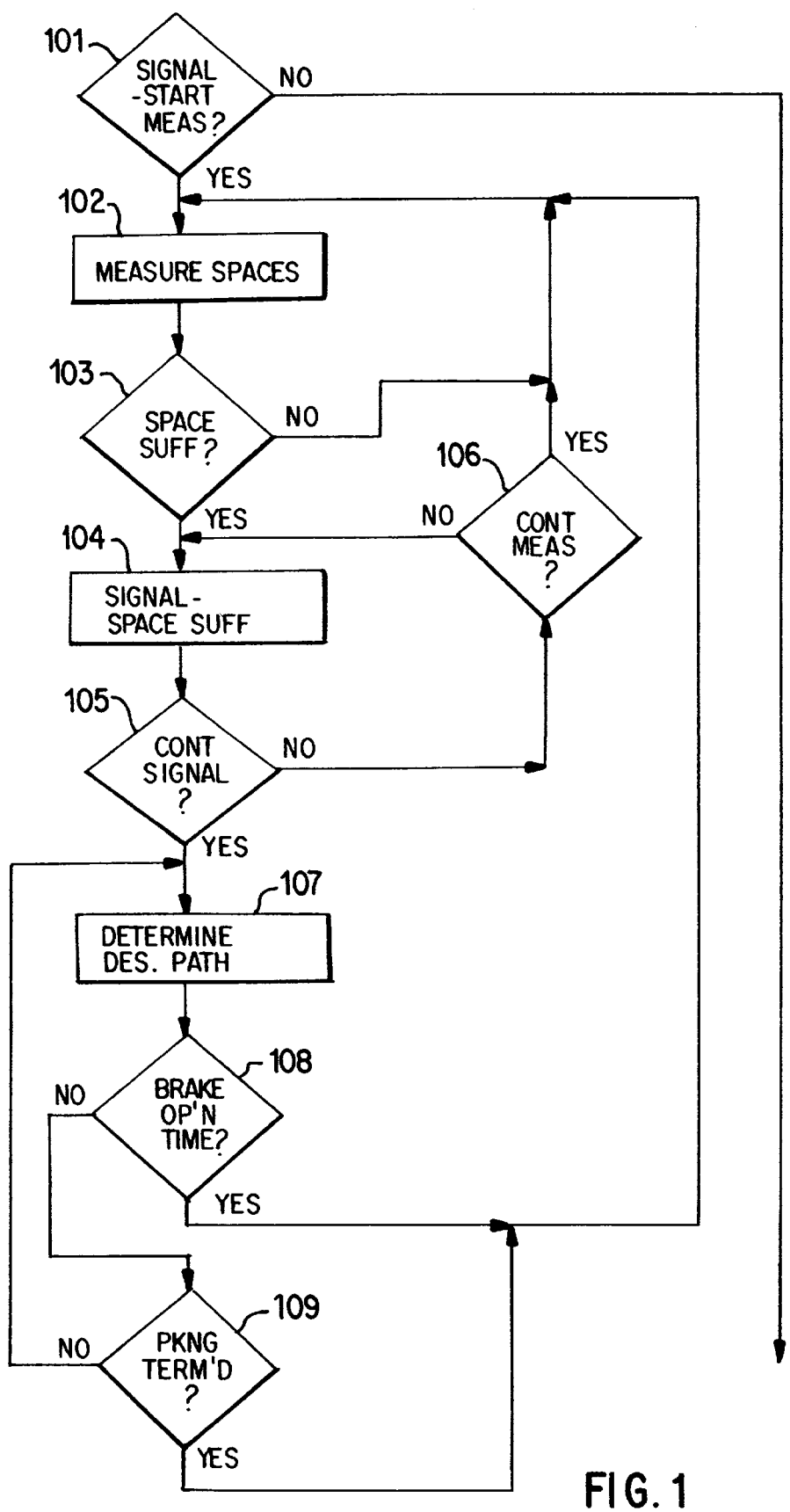
FIG. 1 is a flow chart of the process.

In the flow chart of FIG. 1, it is first examined in step 101 whether a confirmation signal has been entered, indicating that the search for a parking space is to start. If not, the process is terminated. Otherwise processing proceeds to step 102 in which prospective parking spaces are measured.

In step 103, it is determined whether a measured space is large enough for parking. If not, processing returns to step 102 in which the measurement of prospective parking spaces is continued.

If it is found in step 103 that the space is large enough, this information is indicated in step 104, and in step 105 it is determined whether a confirmation signal was entered. By means of this confirmation signal, the actual parking operation is started by the vehicle driver. Advantageously, this confirmation signal can be fed only when the vehicle is stopped.

If it is determined in step 105 that the confirmation signal has not yet been entered, it is determined in step 106 whether the measuring of other parking spaces is to continue. Corresponding criteria for this determination may be, for example, that, after completion of the measurement of a parking space of sufficient size, the confirmation signal corresponding to step 105 was not entered by the vehicle driver within a defined time period. Similarly, this can also be deduced from the fact that the vehicle has driven past a parking space of a sufficient size by a certain distance, or that the vehicle has started driving again after it had stopped. If at least one of these criteria has been met, the process returns to step 102, and measurement of parking spaces is continued, and the stored data concerning the previously measured parking space will then be deleted. If none of these criteria was satisfied in step 106, step 104 is carried out, in which an indication is provided that a parking space of sufficient size was found.

If it is determined in step 105 that the confirmation signal was entered, processing advances to step 107, and a desired curve is determined along which the vehicle can drive into the parking space, based on the momentary position of the vehicle. The momentary position of the vehicle can be determined, for example, by coupling, which may advantageously take place when, during the measuring of the parking space, the end of the parking space was recognized.

By measuring the corresponding adjusting interventions carried out by the vehicle driver, it can be determined whether a deviation exists from the desired curve. If so, such deviation can be indicated to the vehicle driver, so that corrections can be made, and the vehicle can again be guided along the desired curve. Likewise, it is also possible that control elements are connected to the outputs of the microprocessor by means of which corresponding interventions in the steering, the brakes and the driving devices of the motor vehicle can be carried out only by a control of the microprocessor. Then, in step 107, the vehicle is automatically moved along the desired curve.

In step 108, it is examined whether the brake of the vehicle was operated for a defined time period. If so, the parking operation is terminated and the measuring of additional parking gaps takes place corresponding to step 102. A shorter operation of the brake, however, does not terminate the parking operation because it may, for example, also take place simply to let traffic pass by.

If, in step 108, no operation of the brake was determined, it is determined in step 109 whether the parking operation was terminated by the vehicle driver by a manual operation of an input device. If not, the parking operation is continued according to step 107. If it is, however, a transition to step 102 takes place in which the measurement of additional parking spaces is continued.

If the parking operation is concluded, the process is also terminated. The end of the parking operation can be recognized, for example, if the engine is switched off or the vehicle has arrived at the end of the determined desired curve.

Figure 2:
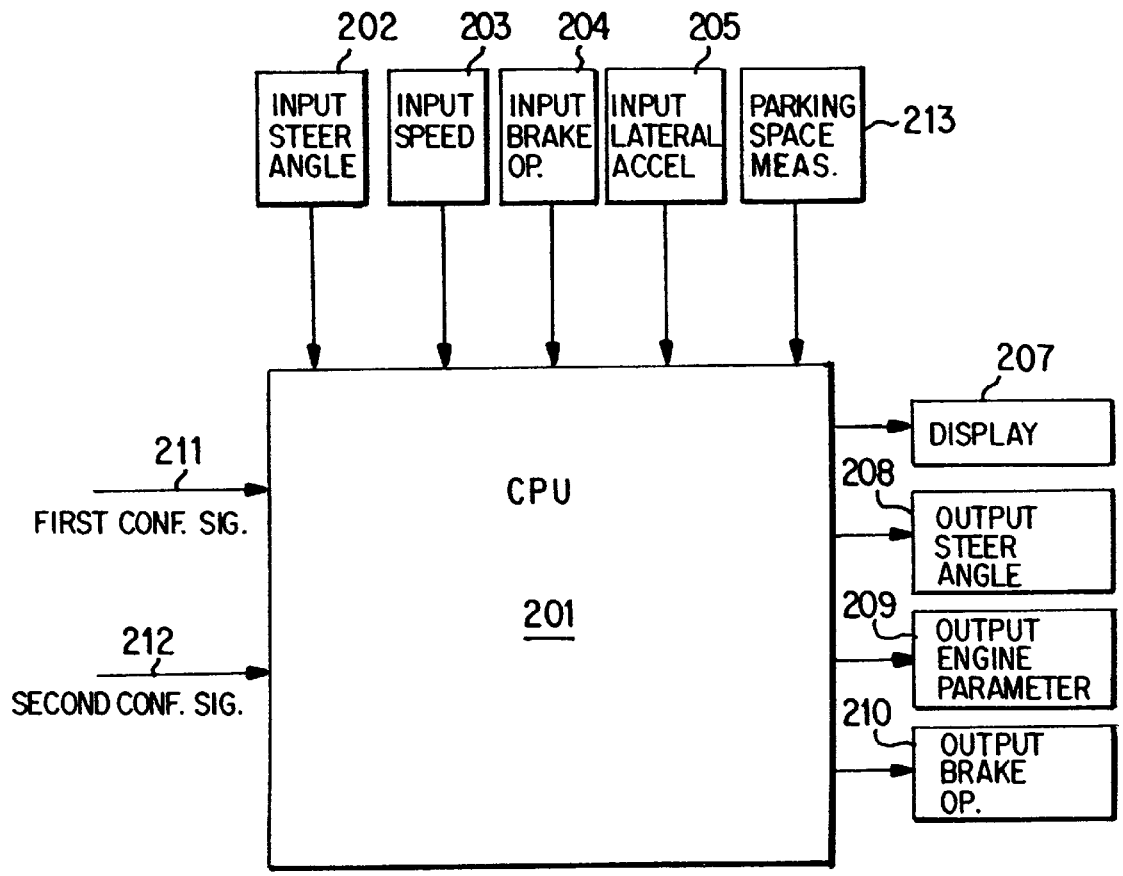
FIG. 2 is a view of the system for carrying out the process.

FIG. 2 illustrates a system for carrying out the process, in which certain signals are fed to a microprocessor 201 by means of which the driving movements of the vehicle are detected. These signals are, for example, the steering angle which is fed by way of the connection 202; the driving speed which is fed by way of the connection 203; a signal 204 which indicates whether the brake is operated and/or a signal 205 is present which represents the lateral acceleration of the vehicle.

The implementation of the process will then take place in the microprocessor. An indicating device 207, for example, is connected to the outputs of the microprocessor and operates as a display (connection 206). Also connected are a control element for adjusting a defined steering angle 208; a control element for controlling the engine 209; as well as a control element for handling a brake intervention 210. By means of the connections 208, 209 and 210, the vehicle can be controlled automatically.

Furthermore, operating elements are connected to the inputs of the microprocessor 201 whose operation may result in the feeding of signals 211 and 212 to the microprocessor 201 by the vehicle driver. The signal 211 may, for example, be used for activating the search for a parking space which is measured by sensors 213. Signal 212 may be the confirmation signal which results in the start of the actual parking operation.

Furthermore, sensors and control elements are connected with the microprocessor for measuring possible parking spaces.

By way of the display, the current operating condition of the system can be indicated to the driver. Likewise, it can be displayed if, for example, during the measurement of a parking space, the vehicle driver has a lateral distance which is too large, or is driving too fast.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for controlling parking of a vehicle having a parking control device for indicating and implementing control interventions for parking said vehicle, comprising:

a vehicle operator entering a search signal into said control device;

in response to said search signal, said control device measuring prospective parking spaces to determine their sufficiency for parking the vehicle and signaling to vehicle operator upon determination of a sufficient parking space;

the vehicle operator entering a parking confirmation signal into said control device in response to said control device signaling a determination of a sufficient parking space, said parking confirmation signal confirming that the vehicle operator wishes to park the vehicle in the determined parking space; and said control device indicating and implementing a control intervention for parking the vehicle only after said parking confirmation signal for the start of the parking operation is entered by the vehicle operator.

2. The process according to claim 1, wherein said measuring of prospective parking spaces is performed in response to a search confirmation signal, which differs from the parking confirmation signal, and which has been entered by the vehicle operator.

3. The process according to claim 1 wherein data concerning a measured parking space are deleted if the Parking confirmation signal has not been entered within a preset time period after measurement of a prospective parking space.

4. The process according to claim 1 wherein data concerning a measured prospective parking space are deleted if the vehicle has driven a preset distance past said measured prospective parking space.

5. The process according to claim 1 wherein data concerning a measured prospective parking space are deleted automatically in response to the vehicle's resumption of driving without parking after it has stopped.

6. The process according to claim 1 wherein the parking confirmation signal can be given only when the vehicle is stopped.

7. The process according to claim 1 wherein:

when a brake of the motor vehicle is operated by the vehicle operator during a parking operation, the parking operation is interrupted; and the parking operation is terminated and data concerning a measured prospective parking space are deleted if the brake has been operated longer than a preset time period.

8. The process according to claim 1, wherein said implementation of control interventions comprises at least one of generating instruction signals to said operator for controlling said vehicle, and controlling vehicle operating parameters to guide said vehicle automatically.

9. A process for controlling parking of a motor vehicle having a parking control device, comprising:

said control device measuring prospective vehicle parking spaces;

said control device identifying a parking space large enough to accommodate the vehicle;

said control device signaling to a driver of the vehicle that an identified space is large enough to accommodate the vehicle;

said control device determining whether, following signaling by said control device that an identified space is large enough to accommodate the vehicle, said driver has entered a parking confirmation signal for commencing a parking operation; and only after a parking confirmation signal entered by said driver, said control device indicating and implementing control intervention for parking said vehicle.

10. The process according to claim 9, wherein said implementing of control intervention comprises at least one of generating instruction signals to said driver for controlling said vehicle, and controlling vehicle operating parameters to guide said vehicle automatically.

11. Apparatus for controlling parking of a motor vehicle, comprising:

a central processing unit;

sensors for detecting operating parameters of said vehicle, which operating parameters bear on movement thereof;

inputs to said central processing unit for entry of parking confirmation signals by an operator of the vehicle;

outputs of said central processing unit for controlling operating parameters of said vehicle bearing on movement thereof by means of parking control intervention signals; and a display unit for displaying signals generated by said central processing unit;

wherein said central processing unit is programmed to measure a Prospective Parking space to determine its sufficiency for parking the vehicle;

to generate a signal causing said display unit to notify the operator of the vehicle that a sufficient Parking space has been identified; and to commence display and implementation of parking control intervention only after the operator of the vehicle has entered a parking confirmation signal commencing a parking operation in response to notification by said display unit that a sufficient space has been identified.

12. The apparatus according to claim 11, wherein said implementation parking of control intervention comprises at least one of generating instruction signals to said operator for controlling said vehicle, and controlling vehicle operating parameters to guide said vehicle automatically.

13. A process for operating a parking control device of a vehicle, comprising:

a vehicle operator entering a search signal into said control device;

said control device measuring prospective parking spaces in response to said search signal, to seek and identify a parking space sufficient to accommodate said vehicle therein;

said control device signaling to said vehicle operator upon identification of a sufficient parking space;

said vehicle operator entering a parking confirmation signal in response to a signaled identification of a sufficient parking space by said control device; and said control device implementing an automatic parking control intervention for said vehicle only after entry of said parking confirmation signal.

14. Process according to claim 13 wherein said automatic parking control intervention comprises one of said control device providing vehicle maneuvering instructions to said vehicle operator for parking said vehicle, and said control device directly controlling maneuvering of said vehicle for parking thereof.

* * * * *